L. WHITCOMB.
PULLEY.
APPLICATION FILED DEC. 26, 1908.

921,766.

Patented May 18, 1909.
2 SHEETS—SHEET 1.

Witnesses.
C. H. Gannett
J. Murphy

Inventor:
Lawrence Whitcomb
By Jas. H. Churchill
Atty.

UNITED STATES PATENT OFFICE.

LAWRENCE WHITCOMB, OF BROOKLINE, MASSACHUSETTS, ASSIGNOR TO NATIONAL BRAKE AND CLUTCH COMPANY, OF BOSTON, MASSACHUSETTS, A CORPORATION.

PULLEY.

No. 921,766.   Specification of Letters Patent.   Patented May 18, 1909.

Application filed December 26, 1908. Serial No. 469,365.

*To all whom it may concern:*

Be it known that I, LAWRENCE WHITCOMB, a citizen of the United States, residing in Brookline, county of Norfolk, and State of Massachusetts, have invented an Improvement in Pulleys, of which the following description, in connection with the accompanying drawings, is a specification, like characters on the drawings representing like parts.

This invention relates to a device having a thin metal rim and is herein shown as embodied in a pulley having its rim and preferably also its spokes and hub made of steel, and has for its object to increase the frictional efficiency of the same. For this purpose, the steel rim is provided with a series of holes or openings extended through it and into which are inserted pieces or inserts of cork of greater thickness than the said rim and which are extended into sockets, depressions or cavities formed in a substantially thin metal backing strip or plate which is riveted or otherwise secured to the inner circumference of the steel rim.

The backing strip or plate may be secured to the steel rim in the manufacture of the pulley or it may be secured thereto after the pulley has been made.

These and other features of this invention will be pointed out in the claims at the end of this specification.

Figure 1:
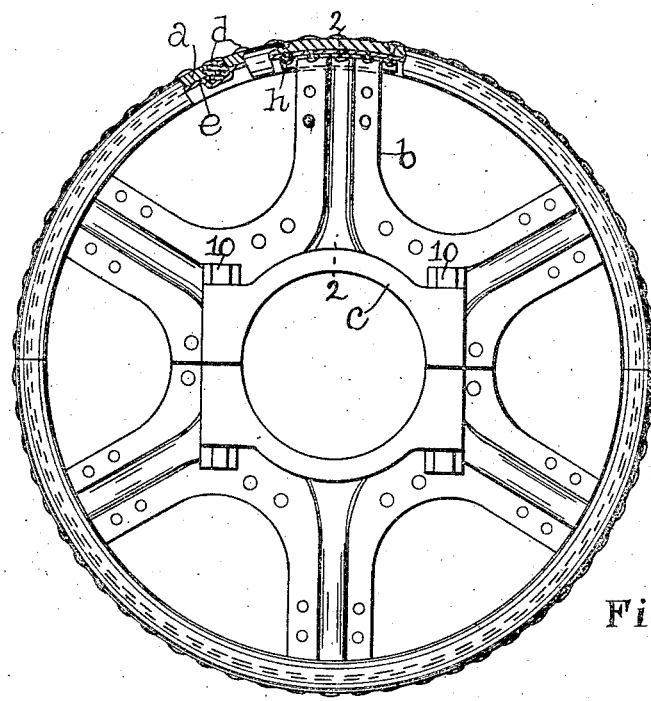
Figure 2:
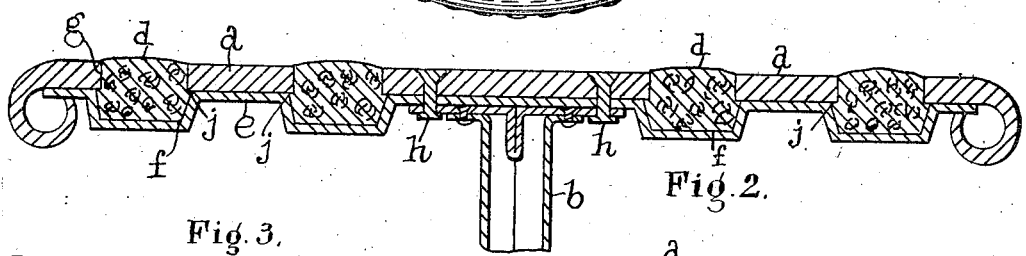
Figure 3:
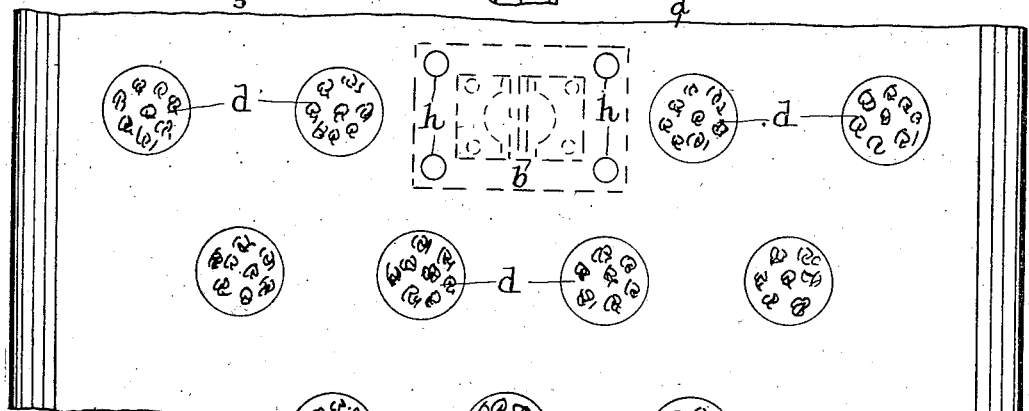

Figure 1 is a side elevation with parts broken away of a steel pulley embodying this invention. Fig. 2, a cross-section on the line 2—2, Fig. 1. Fig. 3, a detail of a portion of the rim of the pulley shown in Fig. 1, and Figs. 4 and 5, modifications to be referred to.

Referring to the drawing, $a$ represents the rim, $b$ the spokes or arms and $c$ the hub of an all steel pulley, of well-known construction.

In pulleys of the class described, the rim is made of substantially thin rolled or pressed steel to obtain lightness, strength and rigidity capable of resisting the compression and other strains incident to its use for transmitting power.

The present invention has for its object to provide the pulley with means coöperating with the thin steel rim $a$ so as to enable the latter to be provided with inserts $d$ of cork, whereby the frictional efficiency of the pulley may be greatly increased. To this end, the steel rim $a$, which is too thin in itself to retain the cork inserts, has secured to its inner circumference a light thin backing piece, strip or section $e$ of metal, preferably steel, which is bent or shaped to form recesses, depressions or sockets $f$, which project beyond the plane of the strip and are of sufficient depth to receive and hold the portions of the cork inserts $d$, which project through openings or holes $g$ in the rim.

The metal backing, strip or plate $e$ may be secured to the rim by rivets $h$, which are employed to fasten the rim $a$ to the spokes or arms $b$, or it may be otherwise secured to said rim, and the sockets or depressions $f$ may be circular in shape and preferably slightly tapering and larger than the holes $g$ in the rim $a$ so that the portion of the cork inserts in the sockets $f$ may expand under the rim $a$ and form locking projections $j$, which serve to lock the cork inserts in the holes in the rim (see Fig. 2).

Figure 5:
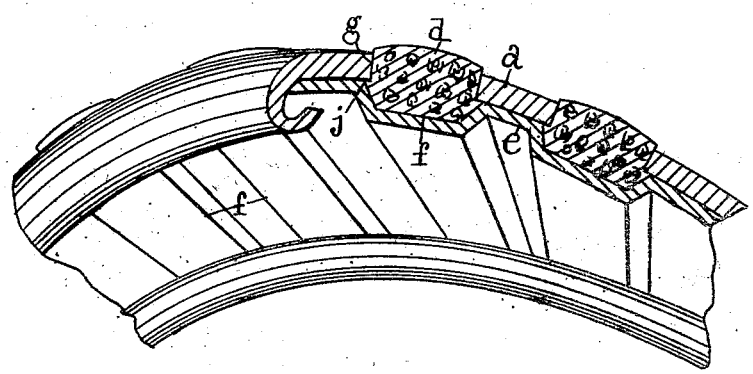
Figure 4:
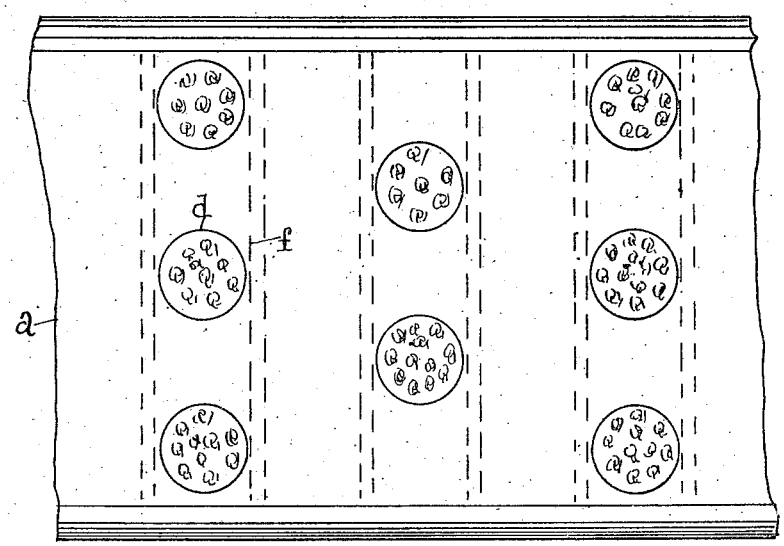

The backing strip or piece $e$ may be provided with sockets or depressions $f$ of circular form and one for each hole or opening $g$ in the steel rim, or said sockets or depressions may be made of other shapes and of a length to register with a plurality of holes or openings $g$, after the manner represented in Figs. 4 and 5, wherein the backing strip $e$ is shown as provided with a socket or depression $f$, which is made of substantially the width of the strip and of the rim $a$ and receives the projecting ends of a plurality of cork inserts.

The pulley shown in Fig. 1, is made in two halves, which are secured together by suitable bolts 10 and the backing strip $e$ may be made of a length equal to the length of the rim of each half, but it is not desired to limit the invention in this respect as the backing strip may be composed of a plurality of pieces or sections which are riveted or otherwise secured to the rim of the pulley. The backing strip also serves to reinforce and strengthen the rim and thereby compensate for any loss of strength which might be occasioned by drilling or otherwise forming a large number of the holes or openings $g$ in the rim $a$. The reinforcing or backing strip may be applied to the pulley when the latter is built up or it may be applied to the rim of a completed pulley, thereby enabling steel pulleys now in use to have their frictional efficiency greatly increased at a minimum cost.

The invention is herein shown as embodied in a pulley, but it is not desired to limit the invention in this respect as the same may be embodied in a section of the steel rim and used as a clutch or brake band or strap.

Claims—

1. The combination with a pulley having a thin rim of steel provided with holes or openings extended through it, of cork inserts extended through said holes or openings and projecting beyond the inner circumference of said rim, and a metal backing strip or piece secured to the said rim and having portions in different planes to form a depression, cavity or socket in line with a hole or opening in the said rim and projecting beyond the plane of the portion of the strip which is secured to the said rim to receive the projecting portion of a cork insert, substantially as described.

2. The combination with a thin strip or band of steel provided with holes or openings extended through it, of cork inserts extended through said holes or openings and projecting beyond the inner surface of said band, and a metal backing strip or piece secured to the inner surface of said band or strip and provided with portions in different planes to form a depression, cavity or socket projecting beyond the plane of the portion of the strip which is secured to said rim for the reception of the projecting portion of a cork insert, substantially as described.

3. The combination with a metal pulley having a thin rim provided with holes or openings extended through it, of cork inserts extended through said holes or openings and projecting beyond the inner surface of the said rim, a metal backing strip or plate secured to said metal rim and having portions in different planes to form a plurality of depressions, cavities or sockets in line with the holes or openings in the said rim and projecting beyond the plane of the portion of the strip which is secured to said rim for the reception of the projecting portions of said cork inserts, substantially as described.

4. The combination with a thin metal band or strip provided with holes or openings through it, of cork inserts extended through said holes or openings and projecting beyond one surface of said band or strip, a thin metal strip or plate secured to the said band or strip and having portions in different planes to form a depression, cavity or socket in line with the opening in the band and projecting beyond the plane of the portion of said strip which is secured to said rim for the reception of the projecting portion of the cork insert, substantially as described.

5. The combination with a thin metal band or strip provided with holes or openings through it, of cork inserts extended through said holes or openings and projecting beyond one surface of said band or strip, a thin metal strip or plate secured to the said band or strip and having portions in different planes to form a depression, cavity or socket in line with the opening in the band and projecting beyond the plane of the portion of said strip which is secured to the said rim for the reception of the projecting portion of the cork insert, said depression, cavity or socket having a portion of greater width than the opening with which it coöperates to permit the cork insert to expand beyond the opening in said band or strip and form a locking projection, substantially as described.

In testimony whereof, I have signed my name to this specification in the presence of two subscribing witnesses.

LAWRENCE WHITCOMB.

Witnesses:
 JAS. H. CHURCHILL,
 J. MURPHY.